(12) United States Patent
Iwamoto

(10) Patent No.: US 11,932,058 B2
(45) Date of Patent: Mar. 19, 2024

(54) TIRE

(71) Applicant: Sumitomo Rubber Industries, Ltd., Hyogo (JP)

(72) Inventor: Naoki Iwamoto, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 0 days.

(21) Appl. No.: 17/717,938

(22) Filed: Apr. 11, 2022

(65) Prior Publication Data

US 2022/0371381 A1 Nov. 24, 2022

(30) Foreign Application Priority Data

May 18, 2021 (JP) .................................. 2021-084143

(51) Int. Cl.
  *B60C 11/12* (2006.01)
  *B60C 11/03* (2006.01)
  *B60C 11/13* (2006.01)

(52) U.S. Cl.
  CPC ...... *B60C 11/1369* (2013.01); *B60C 11/0306* (2013.01); *B60C 11/1236* (2013.01); *B60C 2011/0346* (2013.01); *B60C 2011/1213* (2013.01); *B60C 2011/1254* (2013.01)

(58) Field of Classification Search
  CPC ......... B60C 2011/0369; B60C 11/0306; B60C 11/11; B60C 11/1236
  See application file for complete search history.

(56) References Cited

U.S. PATENT DOCUMENTS

| | | | |
|---|---|---|---|
| 4,649,975 A | 3/1987 | Kogure et al. | |
| 10,994,575 B2 | 5/2021 | Horiguchi et al. | |
| 11,161,375 B2 | 11/2021 | Mori | |
| 2004/0238092 A1* | 12/2004 | Colombo | B60C 11/1384 |
| | | | 152/209.15 |

(Continued)

FOREIGN PATENT DOCUMENTS

| | | |
|---|---|---|
| DE | 10 2011 051224 A1 | 12/2012 |
| EP | 3 375 634 A1 | 9/2018 |

(Continued)

OTHER PUBLICATIONS

JP S62-4608 Machine Translation; Mama, Richiro (Year: 1987).*

(Continued)

*Primary Examiner* — Cedrick S Williams
*Assistant Examiner* — Nicholas J Weiler
(74) *Attorney, Agent, or Firm* — Studebaker & Brackett PC

(57) ABSTRACT

A tire includes a tread portion 2. At least one middle lateral groove 10 includes first and second middle tie bars 16 and 17. First and second middle sipes 21 and 22 are provided on a ground-contact surface 15s of at least one middle block 15. The first middle sipe 21 includes a termination end 21a located on an inner side in a tire axial direction with respect to the first middle tie bar 16. The second middle sipe 22 includes a termination end 22a located on an outer side in the tire axial direction with respect to the second middle tie bar 17 and on the inner side in the tire axial direction with respect to the termination end 21a of the first middle sipe 21. On the ground-contact surface 15s of the middle block 15, no groove and no sipe are provided in a first region 23.

20 Claims, 11 Drawing Sheets

(56) References Cited

U.S. PATENT DOCUMENTS

| | | | | |
|---|---|---|---|---|
| 2009/0188596 A1* | 7/2009 | Kojima | ............... | B60C 11/1315 |
| | | | | 152/209.8 |
| 2014/0305564 A1* | 10/2014 | Sueno | ................. | B60C 11/0306 |
| | | | | 152/209.18 |
| 2016/0193886 A1* | 7/2016 | Iwasaki | ............... | B60C 11/0309 |
| | | | | 152/209.24 |
| 2017/0313135 A1* | 11/2017 | Ichimura | ............. | B60C 11/1392 |
| 2022/0258540 A1* | 8/2022 | Tokunaga | ............... | B60C 11/13 |

FOREIGN PATENT DOCUMENTS

| | | | |
|---|---|---|---|
| JP | S62-4608 A | * | 1/1987 |
| JP | S63-102507 U | | 7/1988 |
| JP | 2009214761 A | * | 9/2009 |
| JP | 2018-203117 A | | 12/2018 |

OTHER PUBLICATIONS

JP 2009-214761 Machine Translation; Nakamoto, Koki (Year: 2009).*
The extended European search report issued by the European Patent Office dated Oct. 20, 2022, which corresponds to European Patent Application No. 22172291.1-1012 and is related to U.S. Appl. No. 17/717,938.

* cited by examiner

TIRE

BACKGROUND OF THE INVENTION

Field of the Invention

The present invention relates to a tire.

Background Art

Japanese Laid-Open Patent Publication No. 2018-203117 proposes a tire having sipes on a tread portion. This tire is expected to maintain excellent performance on ice and snow while maintaining steering stability on a dry road surface, by specifying the sipes.

In the above-described tire, a decrease in the stiffness of a land portion due to the sipes is large, and, for example, during cornering on a dry road surface, the cornering characteristics tend to change suddenly when a slip angle becomes large, so that the tire is required to improve steering stability.

The present invention has been made in view of the above circumstances, and a main object of the present invention is to provide a tire having improved steering stability on a dry road surface while maintaining on-snow performance.

SUMMARY OF THE INVENTION

The present invention is directed to a tire including a tread portion, wherein the tread portion includes a plurality of circumferential grooves continuously extending in a tire circumferential direction between a first tread end and a second tread end, and a plurality of land portions demarcated by the plurality of circumferential grooves, the plurality of land portions include one middle land portion provided between the first tread end and a tire equator, the middle land portion includes a plurality of middle blocks demarcated by a plurality of middle lateral grooves fully traversing the middle land portion in a tire axial direction, at least one of the middle lateral grooves includes a first middle tie bar raised at a groove bottom portion at an end portion on an outer side in the tire axial direction thereof, and a second middle tie bar raised at the groove bottom portion at an end portion on an inner side in the tire axial direction thereof, the plurality of middle blocks each include a ground-contact surface, a first middle circumferential edge extending in the tire circumferential direction on the outer side in the tire axial direction of the ground-contact surface, and a second middle circumferential edge extending in the tire circumferential direction on the inner side in the tire axial direction of the ground-contact surface, at least one first middle sipe extending from the first middle circumferential edge and including a termination end within the ground-contact surface and at least one second middle sipe extending from the second middle circumferential edge and including a termination end within the ground-contact surface are provided on the ground-contact surface of at least one middle block of the plurality of middle blocks, the termination end of the first middle sipe is located on the inner side in the tire axial direction with respect to the first middle tie bar, the termination end of the second middle sipe is located on the outer side in the tire axial direction with respect to the second middle tie bar and located on the inner side in the tire axial direction with respect to the termination end of the first middle sipe, and no groove and no sipe are provided in a first region which is located on the inner side in the tire axial direction with respect to the termination end of the first middle sipe and on the outer side in the tire axial direction with respect to the termination end of the second middle sipe, on the ground-contact surface of the at least one middle block.

In the tire according to the present invention, preferably, the middle lateral grooves include a first middle lateral groove having at least a bent portion at one location.

In the tire according to the present invention, preferably, the bent portion is located between the termination end of the first middle sipe and the termination end of the second middle sipe in the tire axial direction.

In the tire according to the present invention, preferably, a length in the tire axial direction of the first region is 20% to 40% of a width in the tire axial direction of the at least one middle block.

In the tire according to the present invention, preferably, the plurality of land portions include a crown land portion adjacent to the inner side in the tire axial direction of the middle land portion via the circumferential groove, the crown land portion includes a plurality of crown blocks demarcated by a plurality of crown lateral grooves fully traversing the crown land portion in the tire axial direction, the plurality of crown blocks each include a ground-contact surface, a first crown circumferential edge extending in the tire circumferential direction on the first tread end side of the ground-contact surface, and a second crown circumferential edge extending in the tire circumferential direction on the second tread end side of the ground-contact surface, and at least one first crown sipe extending from the first crown circumferential edge and including a termination end within the ground-contact surface and at least one second crown sipe extending from the second crown circumferential edge and including a termination end within the ground-contact surface are provided on the ground-contact surface of at least one crown block of the plurality of crown blocks.

In the tire according to the present invention, preferably, at least one of the crown lateral grooves includes a first crown tie bar raised at a groove bottom portion at an end portion on the first tread end side thereof, and a second crown tie bar raised at the groove bottom portion at an end portion on the second tread end side thereof, and, in a tread plan view, the termination end of the first crown sipe is provided at a position overlapping a region obtained by extending the second crown tie bar so as to be parallel to the tire circumferential direction.

In the tire according to the present invention, preferably, in a tread plan view, the termination end of the second crown sipe is provided at a position overlapping a region obtained by extending the first crown tie bar so as to be parallel to the tire circumferential direction.

In the tire according to the present invention, preferably, the termination end of the second crown sipe is located on the first crown circumferential edge side with respect to the termination end of the first crown sipe, and the crown block has a crown circumferential sipe extending in the tire circumferential direction between the first crown sipe and the second crown sipe.

In the tire according to the present invention, preferably, the crown blocks include a plurality of first crown blocks and a plurality of second crown blocks; on each of the first crown blocks, the crown circumferential sipe is provided on the first crown circumferential edge side with respect to a center position in the tire axial direction of the ground-contact surface of the first crown block; and on each of the second crown blocks, the crown circumferential sipe is provided on the second crown circumferential edge side with respect to a center position in the tire axial direction of the ground-contact surface of the second crown block.

In the tire according to the present invention, preferably, the first crown blocks and the second crown blocks are alternately provided in the tire circumferential direction.

As a result of adopting the above configuration, the tire according to the present invention can improve steering stability on a dry road surface while maintaining on-snow performance.

DETAILED DESCRIPTION

Figure 1:
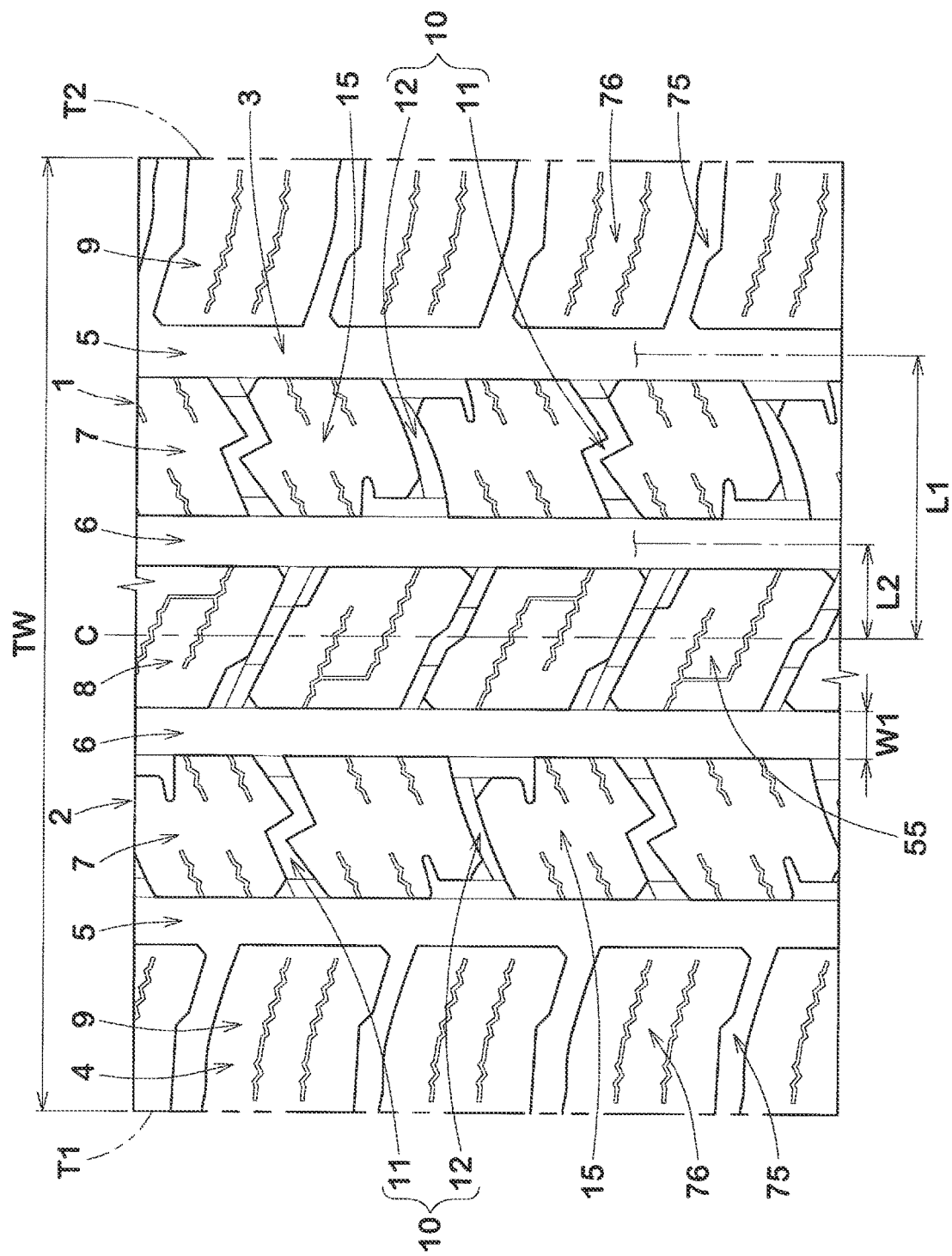
FIG. 1 is a development of a tread portion of a tire according to an embodiment of the present invention.

Hereinafter, an embodiment of the present invention will be described with reference to the drawings. FIG. 1 is a development of a tread portion 2 of a tire 1 showing the embodiment of the present invention. The tire 1 according to the present embodiment is a winter tire which is intended for running on snow or ice, and is suitable for use, for example, as a pneumatic tire for a SUV or a light truck. However, the present invention is not limited to such a mode, and may be applied to a heavy-duty pneumatic tire and a non-pneumatic tire the interior of which is not filled with pressurized air.

As shown in FIG. 1, the tread portion 2 of the present invention includes a plurality of circumferential grooves 3 continuously extending in the tire circumferential direction between a first tread end T1 and a second tread end T2, and a plurality of land portions 4 demarcated by these circumferential grooves 3. The tire 1 according to the present embodiment is formed as a so-called 5-rib tire including a tread portion 2 that includes four circumferential grooves 3 and five land portions 4.

The first tread end T1 and the second tread end T2 each correspond to an end of a ground-contact surface of the tire 1 when a normal load is applied to the tire 1 in a normal state and the tread portion 2 is brought into contact with a flat surface at a camber angle of 0°.

In the case of a pneumatic tire for which various standards are defined, the "normal state" is a state where the tire is fitted on a normal rim and inflated to a normal internal pressure and no load is applied to the tire. In the case of a non-pneumatic tire or a tire for which various standards are not defined, the normal state means a standard use state, corresponding to the purpose of use of the tire, where the tire is not mounted on a vehicle and no load is applied to the tire. In the present specification, unless otherwise specified, dimensions and the like of components of the tire are values measured in the normal state.

The "normal rim" is a rim that is defined, in a standard system including a standard on which the tire is based, by the standard for each tire, and is, for example, the "standard rim" in the JATMA standard, the "Design Rim" in the TRA standard, or the "Measuring Rim" in the ETRTO standard.

The "normal internal pressure" is an air pressure that is defined, in a standard system including a standard on which the tire is based, by the standard for each tire, and is the "maximum air pressure" in the JATMA standard, the maximum value indicated in the table "TIRE LOAD LIMITS AT VARIOUS COLD INFLATION PRESSURES" in the TRA standard, or the "INFLATION PRESSURE" in the ETRTO standard.

In the case of a pneumatic tire for which various standards are defined, the "normal load" is a load that is defined, in a standard system including a standard on which the tire is based, by the standard for each tire, and is the "maximum load capacity" in the JATMA standard, the maximum value indicated in the table "TIRE LOAD LIMITS AT VARIOUS COLD INFLATION PRESSURES" in the TRA standard, or the "LOAD CAPACITY" in the ETRTO standard. In addition, in the case of a tire for which various standards are not defined, the "normal load" refers to the maximum load applicable when the tire is used, according to the above-described standards.

The circumferential grooves 3 include two shoulder circumferential grooves 5 and two crown circumferential grooves 6. One shoulder circumferential groove 5 is provided between the first tread end T1 and a tire equator C, and one shoulder circumferential groove 5 is provided between the second tread end T2 and the tire equator C. The two crown circumferential grooves 6 are provided with the tire equator C located therebetween. Accordingly, one crown circumferential groove 6 is provided between one shoulder circumferential groove 5 and the tire equator C, and one crown circumferential groove 6 is provided between the other shoulder circumferential groove 5 and the tire equator C.

A distance L1 in the tire axial direction from the tire equator C to a groove center line of the shoulder circumferential groove 5 is preferably, for example, 25% to 35% of a tread width TW. A distance L2 in the tire axial direction from the tire equator C to a groove center line of the crown circumferential groove 6 is preferably, for example, 5% to 15% of the tread width TW. The tread width TW is the distance in the tire axial direction from the first tread end T1 to the second tread end T2 in the normal state.

Each circumferential groove 3 of the present embodiment extends, for example, in a straight manner so as to be parallel to the tire circumferential direction. Each circumferential groove 3 may extend, for example, in a wavy manner.

A groove width W1 of each circumferential groove 3 is preferably at least not less than 3 mm. In addition, the groove width W1 of each circumferential groove 3 is preferably, for example, 3.0% to 7.0% of the tread width TW.

The plurality of land portions 4 include two middle land portions 7, one crown land portion 8, and two shoulder land portions 9. One middle land portion 7 is provided between the first tread end T1 and the tire equator C, and one middle land portion 7 is provided between the second tread end T2 and the tire equator C. Accordingly, each middle land portion 7 is demarcated between the shoulder circumferential groove 5 and the crown circumferential groove 6.

The crown land portion 8 is adjacent to the inner side in the tire axial direction of each middle land portion 7 via the circumferential groove 3. The crown land portion 8 is demarcated between the two crown circumferential grooves 6. Each shoulder land portion 9 is adjacent to the outer side in the tire axial direction of the middle land portion 7 via the circumferential groove 3. Each shoulder land portion 9 is demarcated on the outer side in the tire axial direction of the shoulder circumferential groove 5 and includes the first tread end T1 or the second tread end T2.

In the present embodiment, the two middle land portions 7 have configurations that are the same as each other. Hereinafter, in the present specification, one middle land portion 7 will be described, but it is needless to say that the same applies to the other middle land portion 7. In addition, the two shoulder land portions 9 have configurations that are the same as each other, and the configuration of one shoulder land portion 9 described in the present specification can be applied to the other shoulder land portion 9.

Figure 2:
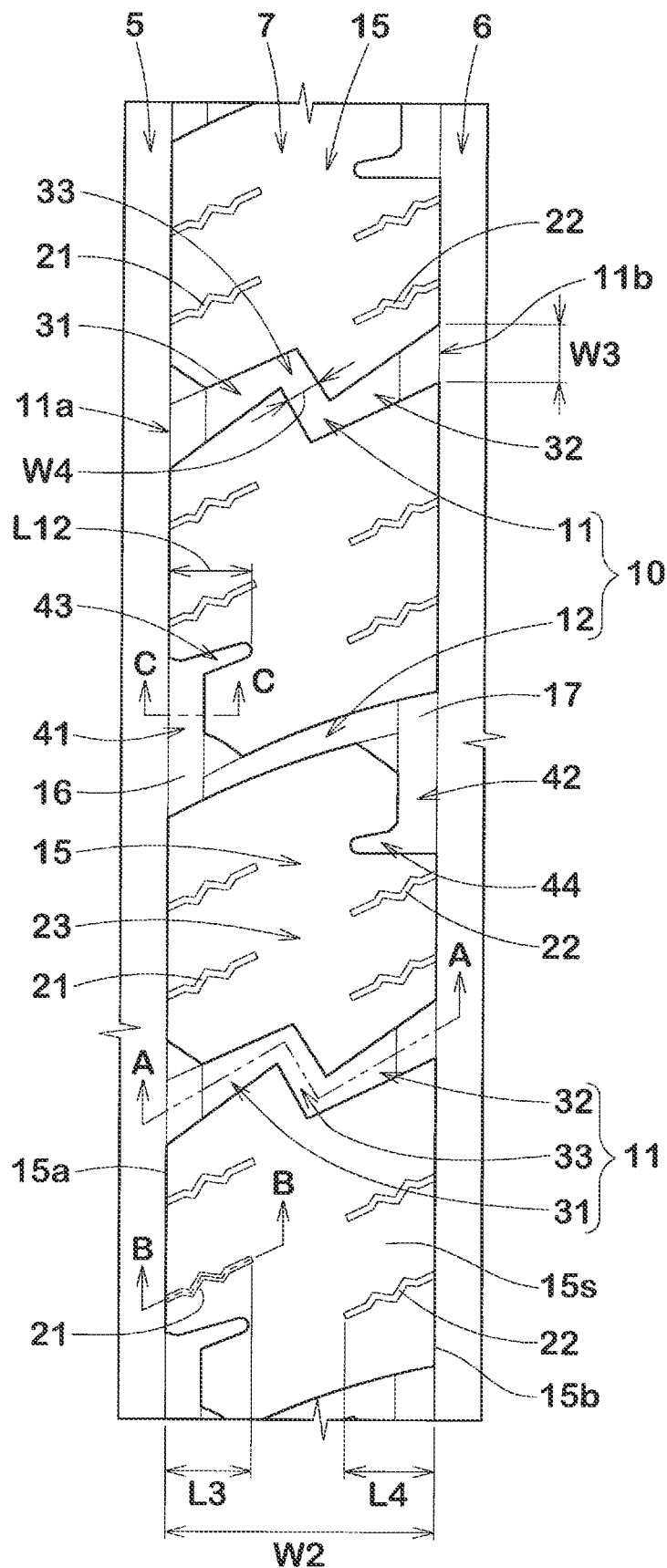
FIG. 2 is an enlarged view of a middle land portion in FIG. 1.

FIG. 2 shows an enlarged view of the middle land portion 7. The middle land portion 7 includes a plurality of middle blocks 15 demarcated by the plurality of middle lateral grooves 10, which fully traverse the middle land portion 7 in the tire axial direction.

Figure 3:
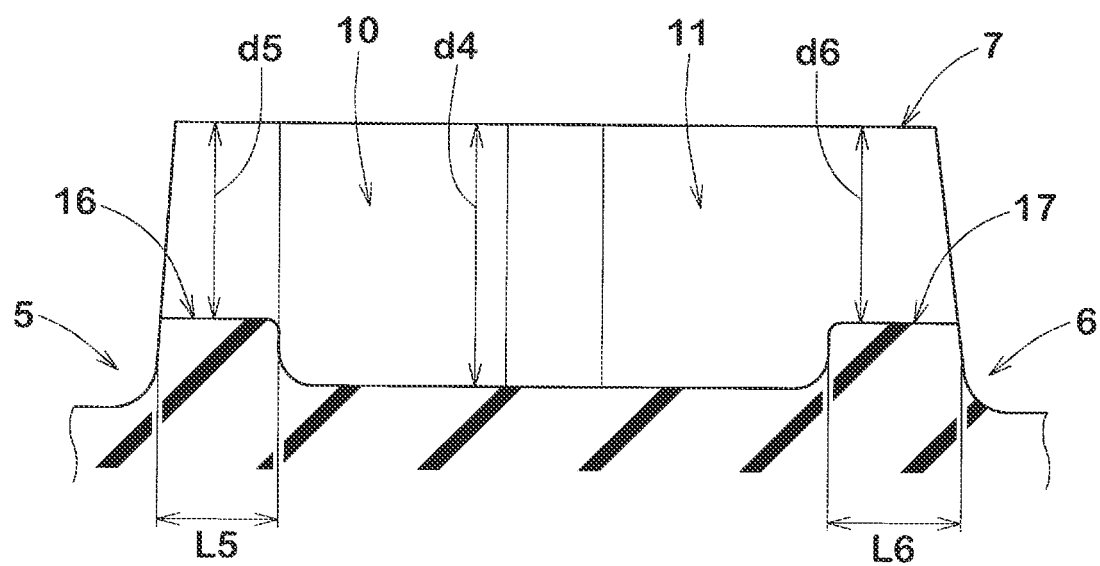
FIG. 3 is a cross-sectional view taken along a line A-A in FIG. 2.

FIG. 3 shows a cross-sectional view taken along a line A-A in FIG. 2. As shown in FIG. 3, at least one middle lateral groove 10 includes a first middle tie bar 16 raised at a groove bottom portion at an end portion on the outer side in the tire axial direction thereof, and a second middle tie bar 17 raised at the groove bottom portion at an end portion on the inner side in the tire axial direction thereof. In the present embodiment, each middle lateral groove 10 is formed so as to include a first middle tie bar 16 and a second middle tie bar 17.

As shown in FIG. 2, the plurality of middle blocks 15 each include a ground-contact surface 15s, a first middle circumferential edge 15a extending in the tire circumferential direction on the outer side in the tire axial direction of the ground-contact surface 15s, and a second middle circumferential edge 15b extending in the tire circumferential direction on the inner side in the tire axial direction of the ground-contact surface 15s.

Figure 4:
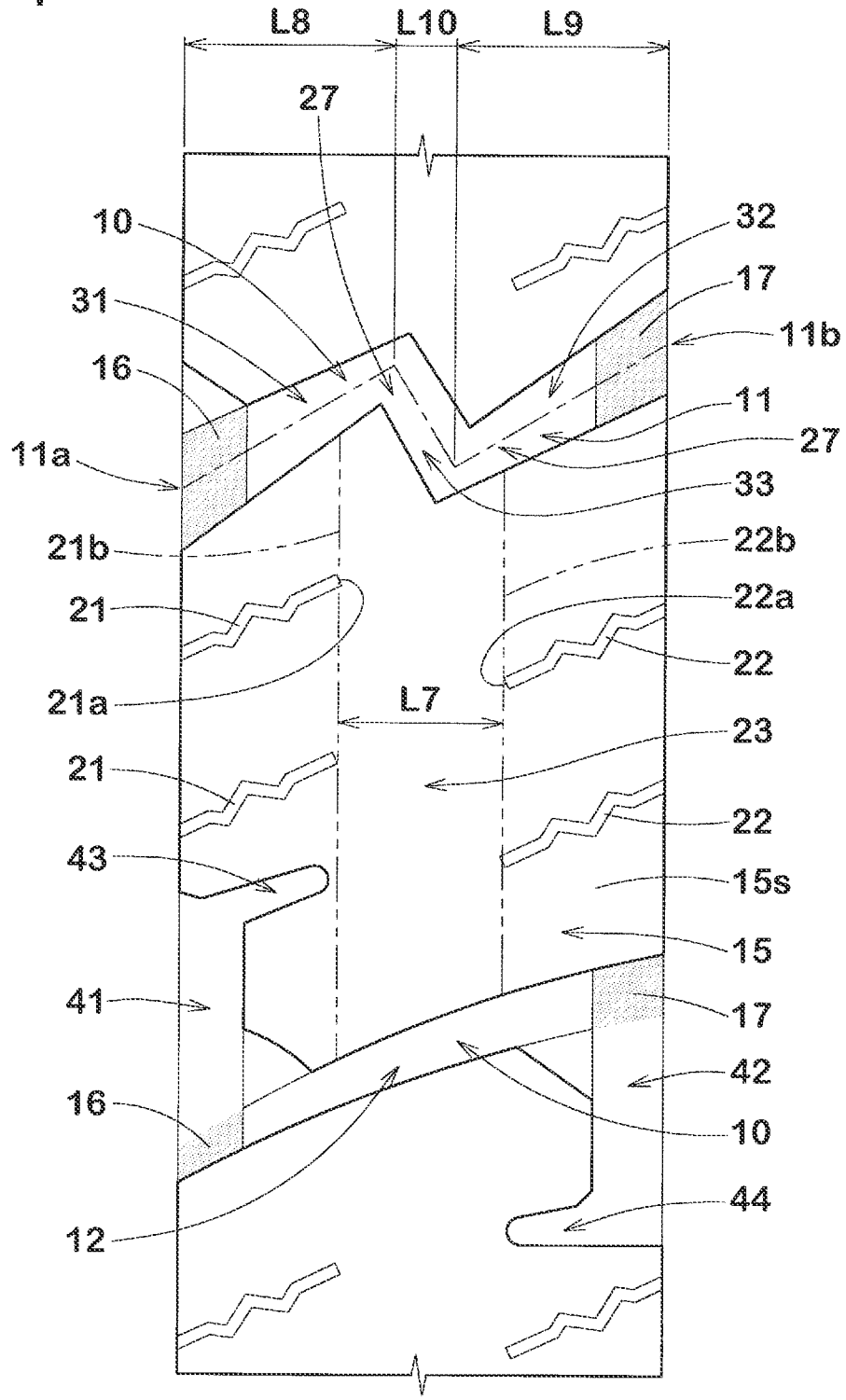
FIG. 4 is an enlarged view of a middle block and middle lateral grooves in FIG. 2.

FIG. 4 shows an enlarged view of the middle block 15 and the middle lateral grooves 10. For easy understanding of the invention, in FIG. 4, the first middle tie bars 16 and the second middle tie bars 17 are dotted. As shown in FIG. 4, at least one first middle sipe 21 and at least one second middle sipe 22 are provided on the ground-contact surface 15s of at least one middle block 15. The first middle sipe 21 extends from the first middle circumferential edge 15a and includes a termination end 21a within the ground-contact surface 15s. The second middle sipe 22 extends from the second middle circumferential edge 15b and includes a termination end 22a within the ground-contact surface 15s.

In the present specification, the "sipe" means a cut element that has a small width and that has a width of 1.5 mm or less between two inner walls facing each other and extending so as to be substantially parallel to each other. In addition, the "substantially parallel" means a mode in which an angle between the two inner walls is not greater than 10°. The width of the sipe is preferably 0.5 to 1.5 mm, and is 0.4 to 1.0 mm in a more preferable mode. In another mode of the sipe, at least one of sipe edges on both sides may be formed as a chamfered portion. In addition, a flask bottom having a width greater than 1.5 mm may be connected to a bottom portion of the sipe.

The termination end 21a of the first middle sipe 21 is located on the inner side in the tire axial direction with respect to the first middle tie bar 16. The termination end 22a of the second middle sipe 22 is located on the outer side in the tire axial direction with respect to the second middle tie bar 17 and located on the inner side in the tire axial direction with respect to the termination end 21a of the first middle sipe 21.

On the ground-contact surface 15s of at least one middle block 15, no groove and no sipe are provided in a first region 23 which is located on the inner side in the tire axial direction with respect to the termination end 21a of the first middle sipe 21 and on the outer side in the tire axial direction with respect to the termination end 22a of the second middle sipe 22. The first region 23 is a region, on the ground-contact surface 15s of the middle block 15, between a virtual line 21b which passes through the termination end 21a of the first middle sipe 21 and which extends so as to be parallel to the tire circumferential direction, and a virtual line 22b which passes through the termination end 22a of the second middle sipe 22 and which extends so as to be parallel to the tire circumferential direction. In the present invention, as a result of adopting the above configuration, steering stability on a dry road surface (hereinafter, sometimes referred to simply as "steering stability") can be improved while maintaining on-snow performance. As for the reason for this, the following mechanism is inferred.

In the present invention, since each middle lateral groove 10 includes the first middle tie bar 16 and the second middle tie bar 17, the stiffness of the middle land portion 7 is effectively maintained, and excellent steering stability is exhibited. Meanwhile, the termination end 21a of each first middle sipe 21 is located on the inner side in the tire axial direction with respect to the first middle tie bar 16, and the termination end 22a of each second middle sipe 22 is located on the outer side in the tire axial direction with respect to the second middle tie bar 17. Accordingly, the lengths of the first middle sipe 21 and the second middle sipe 22 are sufficiently ensured, and on-snow performance is maintained.

Moreover, in the present invention, since no groove and no sipe are provided in the above-described first region 23, the stiffness and the ground-contact area of the middle block 15 are sufficiently ensured. Accordingly, during cornering on a dry road surface, even when a slip angle becomes large, the cornering characteristics do not change suddenly and excellent steering stability is exhibited. In the present invention, it is considered that, owing to such a mechanism, steering stability on a dry road surface is improved while maintaining on-snow performance.

Hereinafter, more detailed configurations of the present embodiment will be described. The configurations described below show a specific mode of the present embodiment. Therefore, it is needless to say that the present invention can achieve the above-described effect even when the configurations described below are not provided. In addition, even when any one of the configurations described below is independently applied to the tire according to the present invention having the above-described characteristics, performance improvement corresponding to each configuration can be expected. Furthermore, when some of the configurations described below are applied in combination, complex performance improvement corresponding to each configuration can be expected.

As shown in FIG. 2, each middle block 15 of the present embodiment has two first middle sipes 21 and two second middle sipes 22. The first middle sipes 21 and the second middle sipes 22 each extend in a zigzag manner Such first middle sipes 21 and second middle sipes 22 can enhance on-snow performance while maintaining the stiffness of the middle block 15.

A length L3 in the tire axial direction of each first middle sipe 21 and a length L4 in the tire axial direction of each second middle sipe 22 are each, for example, 25% to 40% of a width W2 in the tire axial direction of the middle block 15. In addition, the length L3 of each first middle sipe 21 is 150% to 300% of a length L5 (shown in FIG. 3) in the tire axial direction of the first middle tie bar 16. Similarly, the length L4 of each second middle sipe 22 is 1.5 to 3.0 times a length L6 (shown in FIG. 3) in the tire axial direction of the second middle tie bar 17. Such first middle sipes 21 and second middle sipes 22 improve on-snow performance and steering stability in a well-balanced manner.

The first middle sipes 21 and the second middle sipes 22 are inclined relative to the tire axial direction in the same direction. Angles of the first middle sipes 21 and the second middle sipes 22 with respect to the tire axial direction are, for example, 20 to 35°. In the case where these sipes extend in a zigzag manner, the above angles are each measured at an amplitude center line of the zigzag of the sipe. Such first middle sipes 21 and second middle sipes 22 can also provide frictional force in the tire axial direction during running on snow.

Figure 5:
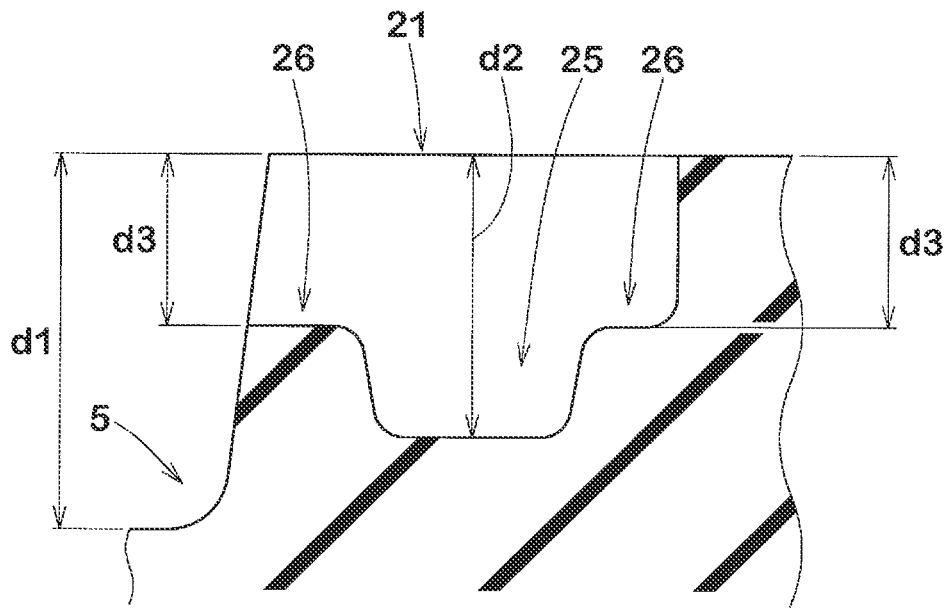
FIG. 5 is a cross-sectional view taken along a line B-B in FIG. 2.

FIG. 5 shows a cross-sectional view taken along a line B-B in FIG. 2. It is considered that, on the inner wall of the actual first middle sipe 21, a folded portion of the zigzag of the sipe appears as a ridge, but the folded portion is not shown in FIG. 5. As shown in FIG. 5, the first middle sipe 21 has a larger depth at a center portion 25 in the tire axial direction thereof than at end portions 26 on both sides in the tire axial direction thereof. Accordingly, the first middle sipe 21 has a maximum depth d2 at the center portion 25. The maximum depth d2 of the first middle sipe 21 is, for example, 65% to 85% of a depth d1 of the shoulder circumferential groove 5. In addition, a depth d3 of each end portion 26 of the first middle sipe 21 is, for example, 50% to 70% of the maximum depth d2. Such a first middle sipe 21 moderately and easily opens at the center portion 25 and can provide large frictional force on snow or ice. Since each second middle sipe 22 has the same cross-sectional shape as each first middle sipe 21, the above-described configuration of the first middle sipe 21 can be applied to each second middle sipe 22.

As shown in FIG. 4, in the first region 23, no groove and no sipe are provided, and other minute recesses and the like are not provided. Accordingly, a flat ground-contact surface is formed in the first region 23. A length L7 in the tire axial direction of the first region 23 is 20% to 40% of the width W2 (shown in FIG. 2, the same applies below) in the tire axial direction of the middle block 15. Accordingly, the stiffness of the middle block 15 is ensured, and excellent steering stability is exhibited. In the case where a plurality of first middle sipes 21 having different lengths are provided, and in the case where a plurality of second middle sipes 22 having different lengths are provided, the first region 23 is specified such that the length in the tire axial direction of the first region 23 is the smallest.

As shown in FIG. 3, the length L5 in the tire axial direction of the first middle tie bar 16 and the length L6 of the second middle tie bar 17 are each preferably 10% to 20% of the width W2 of the middle block 15. In the case where the lengths in the tire axial direction of the first middle tie bar 16 and the second middle tie bar 17 change in the tire radial direction, the length L5 and the length L6 are each measured at a center position in the tire radial direction. As a more preferable mode, in the present embodiment, the first middle tie bar 16 and the second middle tie bar 17 are formed in substantially the same shape.

A depth d5 from the ground-contact surface of the middle block 15 to the outer surface of the first middle tie bar 16 and a depth d6 from the ground-contact surface of the middle block 15 to the outer surface of the second middle tie bar 17 are each 65% to 85% of a maximum depth d4 of the middle lateral groove 10. In a more preferable mode, the depth d5 and the depth d6 are each smaller than the maximum depth d2 (shown in FIG. 5, the same applies below) of the first middle sipe 21 and larger than the depth d3 (shown in FIG. 5, the same applies below) of the end portions 26 in the tire axial direction of the first middle sipe 21. Such a depth arrangement serves to suppress uneven wear of the middle block 15 while exhibiting the above-described effects.

As shown in FIG. 4, the middle lateral grooves 10 include first middle lateral grooves 11 each having at least a bent portion at one location. The middle lateral grooves 10 of the present embodiment also include second middle lateral grooves 12 each having a different shape in a tread plan view from that of each first middle lateral groove 11. On the middle land portion 7 of the present embodiment, the first middle lateral grooves 11 and the second middle lateral grooves 12 are alternately provided in the tire circumferential direction. Each first middle lateral groove 11 includes bent portions 27 at two locations. Both the first middle lateral grooves 11 and the second middle lateral grooves 12 have the cross-sectional shape shown in FIG. 3.

Each bent portion 27 is preferably located between the termination end 21a of the first middle sipe 21 and the termination end 22a of the second middle sipe 22 in the tire axial direction. Accordingly, local deformation is less likely to occur in the middle block 15, and excellent steering stability is exhibited.

Each first middle lateral groove 11 includes a first groove portion 31, a second groove portion 32, and a third groove portion 33. The first groove portion 31 is inclined relative to the tire axial direction from a first end 11a on the outer side in the tire axial direction of the first middle lateral groove 11. The second groove portion 32 is inclined relative to the tire axial direction in the same direction as the first groove portion 31 from a second end 11b on the inner side in the tire axial direction of the first middle lateral groove 11. The third groove portion 33 is located between the first groove portion 31 and the second groove portion 32 and is inclined relative to the tire axial direction in a direction opposite to that of the first groove portion 31. In the first middle lateral groove 11 including such a first groove portion 31, such a second groove portion 32, and such a third groove portion 33, the air does not easily move therein, so that pumping sounds are small and noise performance can be improved.

In a preferable mode, the first groove portion 31 has a groove width increasing from the third groove portion 33 side toward the outer side in the tire axial direction. The second groove portion 32 has a groove width increasing from the third groove portion 33 side toward the inner side in the tire axial direction. Accordingly, during running on snow, snow is easily discharged from the first groove portion 31 and the second groove portion 32, and excellent on-snow performance is continuously exhibited.

As shown in FIG. 2, each first middle lateral groove 11 has a maximum groove width at the first end 11a or the second end 11b. In addition, the third groove portion 33 extends with a constant groove width. A maximum groove width W3 of the first middle lateral groove 11 is preferably 120% to 200% of a groove width W4 of the third groove portion 33. Accordingly, noise performance and on-snow performance are improved in a well-balanced manner.

As shown in FIG. 4, a length L8 in the tire axial direction of the first groove portion 31 and a length L9 in the tire axial direction of the second groove portion 32 are each, for example, 35% to 45% of the width W2 in the tire axial direction of the ground-contact surface of the middle block 15. In addition, a length L10 in the tire axial direction of the third groove portion 33 is, for example, 10% to 30% of the width W2 of the middle block 15.

An angle of the first groove portion 31 or the second groove portion 32 with respect to the tire axial direction is, for example, 25 to 45°. An angle of the third groove portion 33 with respect to the tire axial direction is, for example, 50 to 65°. An angle between the first groove portion 31 and the third groove portion 33 and an angle between the second groove portion 32 and the third groove portion 33 are, for example, 80 to 110° and preferably 90 to 110°. During running on snow, such an arrangement of each groove portion allows a hard snow column to be generated in the groove to provide a large snow column shearing force, and can suppress clogging of the groove with snow.

Each second middle lateral groove 12 is, for example, inclined relative to the tire axial direction in the same direction as the first groove portion 31 of the first middle lateral groove 11. Each second middle lateral groove 12 of the present embodiment is inclined, for example, at an angle of 10 to 30°.

As shown in FIG. 2, the middle land portion 7 has first recesses 41 and second recesses 42. Each first recess 41 extends from an end portion on the outer side in the tire axial direction of the second middle lateral groove 12 to one side in the tire circumferential direction (the upper side in the drawings of the present application). Each second recess 42 extends from an end portion on the inner side in the tire axial direction of the second middle lateral groove 12 to the other side in the tire circumferential direction (the lower side in the drawings of the present application).

Figure 6:
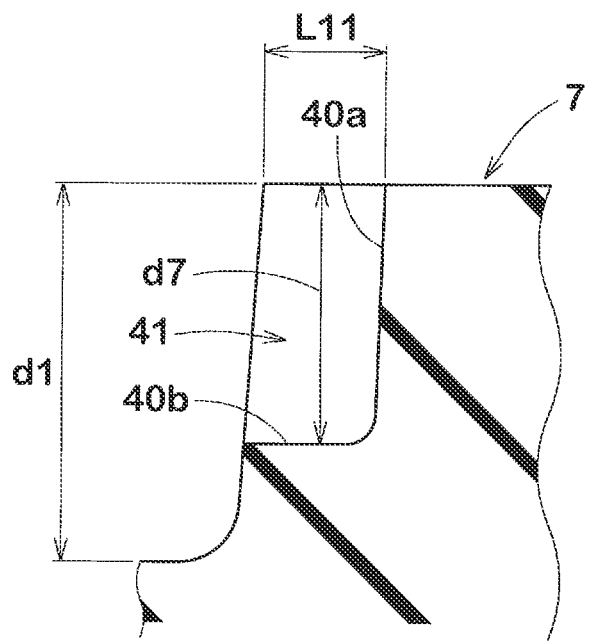
FIG. 6 is a cross-sectional view taken along a line C-C in FIG. 2.

FIG. 6 shows a cross-sectional view taken along a line C-C in FIG. 2, as a view showing a cross-section of each of the first recesses 41 and the second recesses 42. As shown in FIG. 6, the first recesses 41 and the second recesses 42 are each open on the ground-contact surface and a side surface in the tire axial direction of the middle land portion 7. Accordingly, the first recesses 41 and the second recesses 42 each include an inner wall surface 40a extending so as to be parallel to the tire radial direction, and a bottom surface 40b extending so as to be parallel to the ground-contact surface of the middle land portion 7. A length L11 in the tire axial direction of each of the first recesses 41 and the second recesses 42 on the ground-contact surface of the middle land portion 7 is, for example, 5% to 15% of the width W2 of the ground-contact surface 15s of the middle block 15.

A depth d7 of each of the first recesses 41 and the second recesses 42 is, for example, 60% to 75% of the depth d1 of the shoulder circumferential groove 5. In a more preferable mode, as shown in FIG. 4, the bottom surface of the first recess 41 is connected to the outer surface of the first middle tie bar 16 (shown in FIG. 2) so as to be flush therewith. In addition, the bottom surface of the second recess 42 is connected to the outer surface of the second middle tie bar 17 (shown in FIG. 2) so as to be flush therewith. Accordingly, during running on snow, the second middle lateral groove 12, the first recess 41, and the second recess 42 can cooperate to form a large snow column and provide a large snow column shearing force.

As shown in FIG. 2, the middle land portion 7 has at least one first termination groove 43 extending in the tire axial direction. The first termination groove 43 is connected at an end portion on the outer side in the tire axial direction thereof to the first recess 41, and terminates at an end portion on the inner side in the tire axial direction thereof within the ground-contact surface of the middle land portion 7. In a preferable mode, the first termination groove 43 is connected to an end portion in the tire circumferential direction of the first recess 41. Such a first termination groove 43 has a small pumping sound and can improve on-snow performance while maintaining noise performance.

A length L12 in the tire axial direction of the first termination groove 43 is, for example, 25% to 35% of the width W2 of the middle block 15. Such a first termination groove 43 can enhance on-snow performance and noise performance in a well-balanced manner.

The middle land portion 7 has at least one second termination groove 44 extending in the tire axial direction. The second termination groove 44 is connected at an end portion on the inner side in the tire axial direction thereof to the second recess 42, and terminates at an end portion on the outer side in the tire axial direction thereof within the ground-contact surface of the middle land portion 7.

The above-described length L12 of the first termination groove 43 can be applied to the length in the tire axial direction of the second termination groove 44.

The bottom surface of the first termination groove 43 is connected to the bottom surface of the first recess 41 so as to be flush therewith. The bottom surface of the second termination groove 44 is connected to the bottom surface of the second recess 42 so as to be flush therewith. Such a first termination groove 43 and such a second termination groove 44 can suppress local deformation of the middle block 15 and serve to enhance steering stability.

Figure 7:
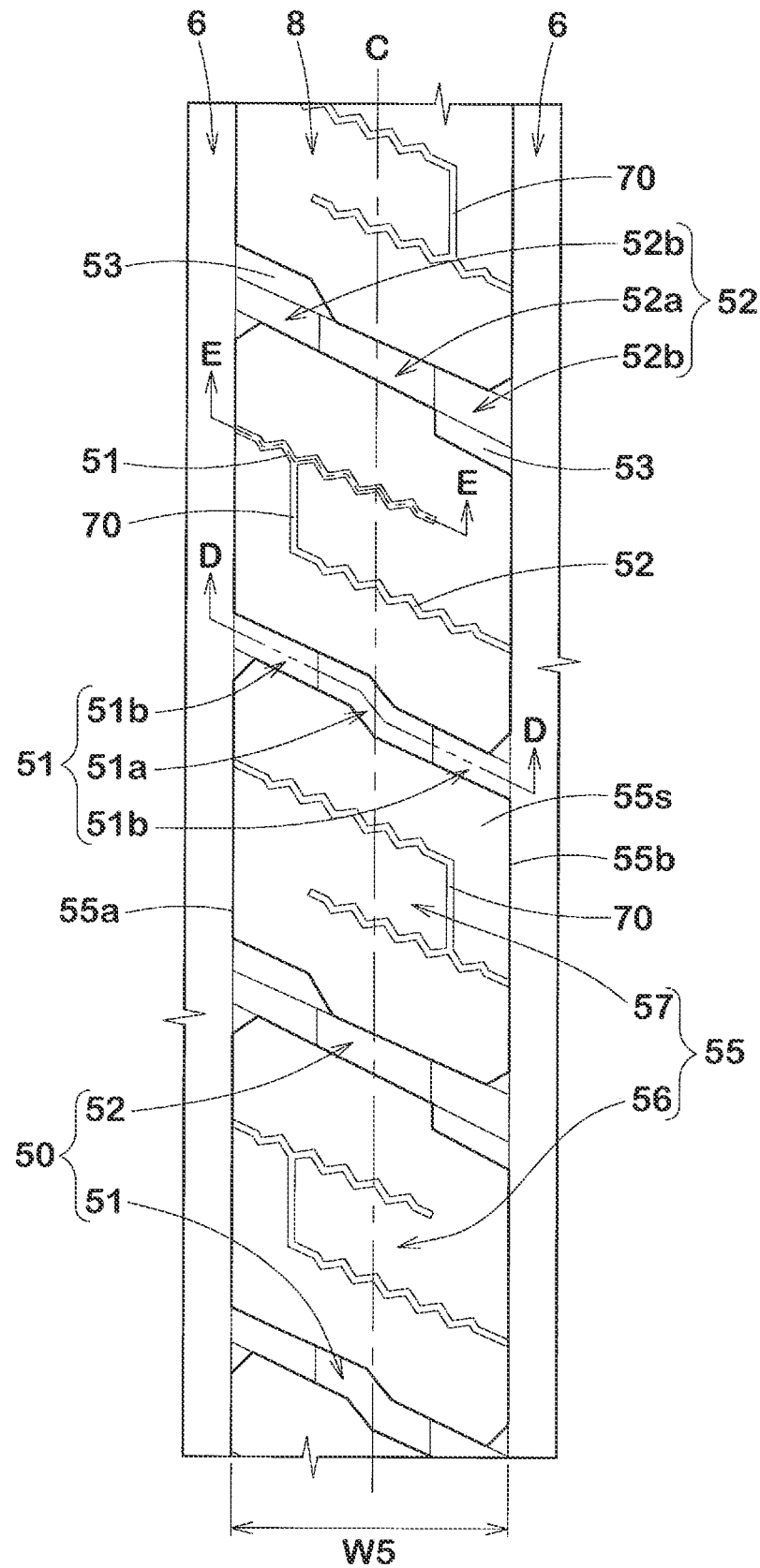
FIG. 7 is an enlarged view of a crown land portion in FIG. 1.

FIG. 7 shows an enlarged view of the crown land portion 8 in FIG. 1. As shown in FIG. 7, the crown land portion 8 includes a plurality of crown blocks 55 demarcated by a plurality of crown lateral grooves 50 which fully traverse the crown land portion 8 in the tire axial direction.

The plurality of crown lateral grooves 50 are inclined relative to the tire axial direction in a direction opposite to that of the middle lateral grooves 10 (shown in FIG. 2). Accordingly, pumping sounds generated by the middle lateral grooves 10 and the crown lateral grooves 50 are easily made to become white noise, so that noise performance is improved.

The crown lateral grooves 50 include, for example, first crown lateral grooves 51 and second crown lateral grooves 52 having different shapes in a tread plan view. In the present embodiment, the first crown lateral grooves 51 and the second crown lateral grooves 52 are alternately provided in the tire circumferential direction.

Each first crown lateral groove 51 extends, for example, in the tire axial direction with a constant groove width. The first crown lateral groove 51 includes a steeply inclined portion 51a provided at a center portion in the tire axial direction thereof, and gently inclined portions 51b connected to both sides of the steeply inclined portion 51a. An angle of the steeply inclined portion 51a with respect to the tire axial direction is, for example, 40 to 60°. Each gently inclined portion 51b is inclined relative to the tire axial direction in the same direction as the steeply inclined portion 51a. The gently inclined portion 51b is provided at a smaller angle with respect to the tire axial direction than the steeply inclined portion 51*a*. The angle of the gently inclined portion 51*b* with respect to the tire axial direction is, for example, 20 to 30°. The length in the tire axial direction of one gently inclined portion 51*b* is 40% to 50% of the overall length of the crown lateral groove 50. These angles and lengths are each measured at a groove center line. In the crown lateral groove 50 including such a steeply inclined portion 51*a* and gently inclined portions 51*b*, the air does not easily move therein, and pumping sounds can be reduced.

Each second crown lateral groove 52 includes, for example, a center portion 52*a* in the tire axial direction, and widening portions 52*b* connected to the center portion 52*a*. Each widening portion 52*b* has, for example, a larger groove width than the center portion 52*a*. The groove width of the widening portion 52*b* is, for example, 150% to 250% of the groove width of the center portion 52*a*. In the present embodiment, a chamfered portion 53 is formed at the widening portion 52*b*, whereby a large groove width is formed at the widening portion 52*b*. Such a second crown lateral groove 52 can enhance on-snow performance and steering stability in a well-balanced manner.

Figure 8:
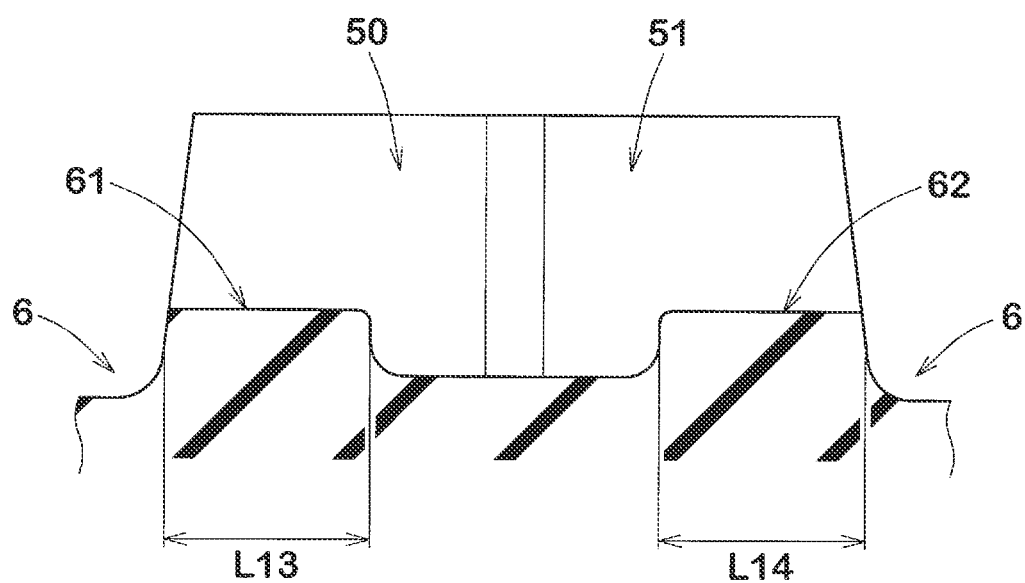
FIG. 8 is a cross-sectional view taken along a line D-D in FIG. 7.

FIG. 8 shows a cross-sectional view taken along a line D-D in FIG. 7. As shown in FIG. 8, the crown lateral groove 50 includes a first crown tie bar 61 raised at a groove bottom portion at an end portion on the first tread end T1 side thereof, and a second crown tie bar 62 raised at the groove bottom portion at an end portion on the second tread end T2 side thereof. Such a first crown tie bar 61 and such a second crown tie bar 62 serve to enhance steering stability.

A length L13 in the tire axial direction of the first crown tie bar 61 and a length L14 in the tire axial direction of the second crown tie bar 62 are each 25% to 35% of a width W5 (shown in FIG. 7) in the tire axial direction of a ground-contact surface 55*s* of the crown block 55. In a more preferable mode, the length L13 of the first crown tie bar 61 is preferably larger than the length L5 (shown in FIG. 3) of the first middle tie bar 16. Similarly, the length L14 of the second crown tie bar 62 is preferably larger than the length L6 (shown in FIG. 3) of the second middle tie bar 17. Accordingly, the stiffness balance of the crown land portion 8 and the middle land portions 7 is made appropriate, so that steering stability is further improved. In the present embodiment, each of the first crown lateral grooves 51 and the second crown lateral grooves 52 include a first crown tie bar 61 and a second crown tie bar 62.

As shown in FIG. 7, the plurality of crown blocks 55 each include the ground-contact surface 55*s*, a first crown circumferential edge 55*a* extending in the tire circumferential direction on the first tread end T1 side of the ground-contact surface 55*s*, and a second crown circumferential edge 55*b* extending in the tire circumferential direction on the second tread end T2 side of the ground-contact surface 55*s*.

Figure 9:
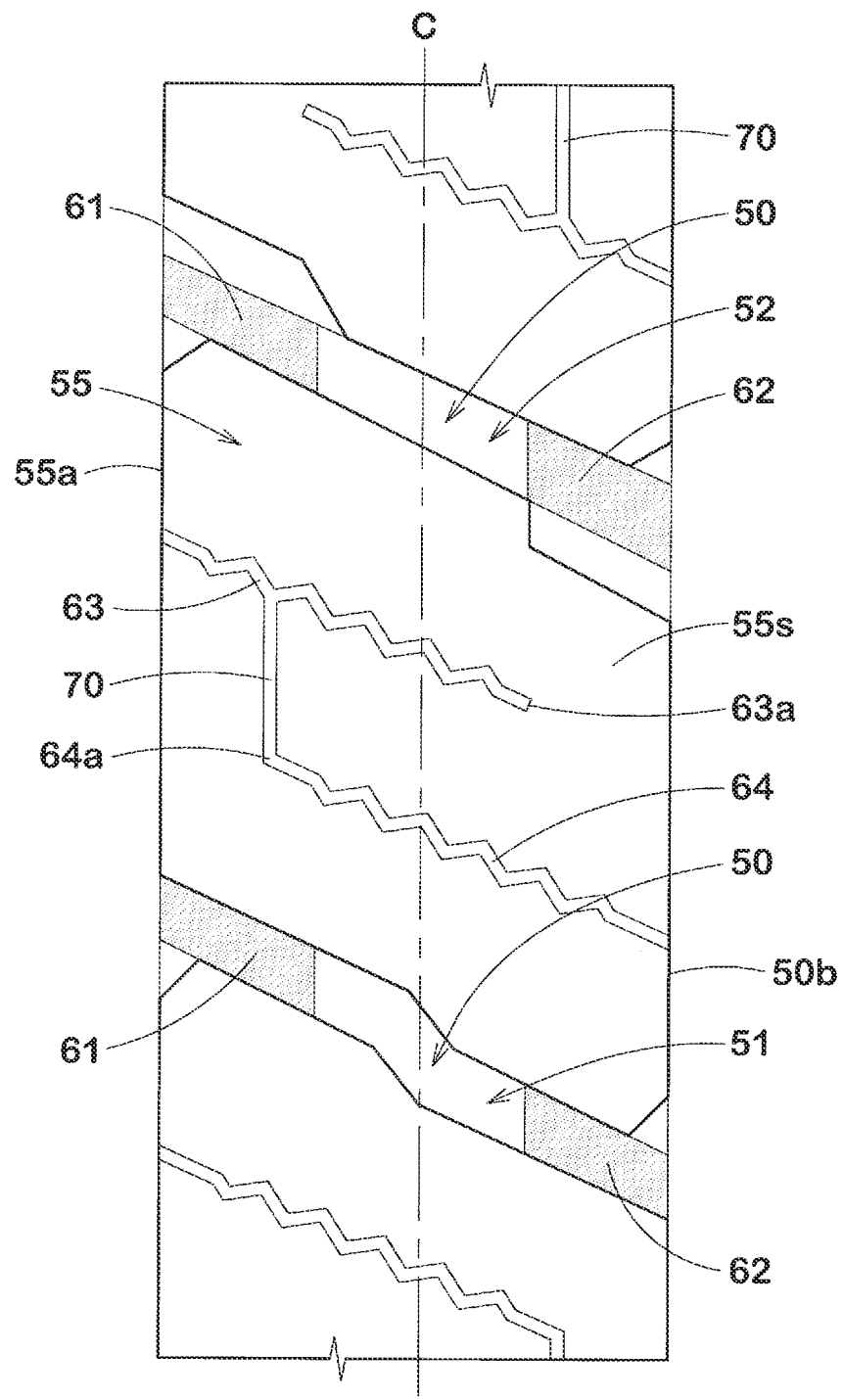
FIG. 9 is an enlarged view of a crown block and crown lateral grooves in FIG. 7.

FIG. 9 shows an enlarged view of the crown block 55 and the crown lateral grooves 50. In FIG. 9, the above-described first crown tie bars 61 and second crown tie bars 62 are dotted. As shown in FIG. 9, at least one first crown sipe 63 and at least one second crown sipe 64 are provided on the ground-contact surface 55*s* of at least one crown block 55. The first crown sipe 63 extends from the first crown circumferential edge 55*a* and includes a termination end 63*a* within the ground-contact surface 55*s*. The second crown sipe 64 extends from the second crown circumferential edge 55*b* and includes a termination end 64*a* within the ground-contact surface 55*s*. Such a first crown sipe 63 and such a second crown sipe 64 can enhance on-snow performance while maintaining the stiffness of the crown block 55.

The termination end 64*a* of the second crown sipe 64 is located on the first crown circumferential edge 55*a* side with respect to the termination end 63*a* of the first crown sipe 63. In a further preferable mode, in a tread plan view, the termination end 63*a* of the first crown sipe 63 is provided at a position overlapping a region obtained by extending the second crown tie bar 62 so as to be parallel to the tire circumferential direction. Similarly, in a tread plan view, the termination end 64*a* of the second crown sipe 64 is provided at a position overlapping a region obtained by extending the first crown tie bar 61 so as to be parallel to the tire circumferential direction. Accordingly, uneven wear of the crown land portion 8 is suppressed.

Figure 10:
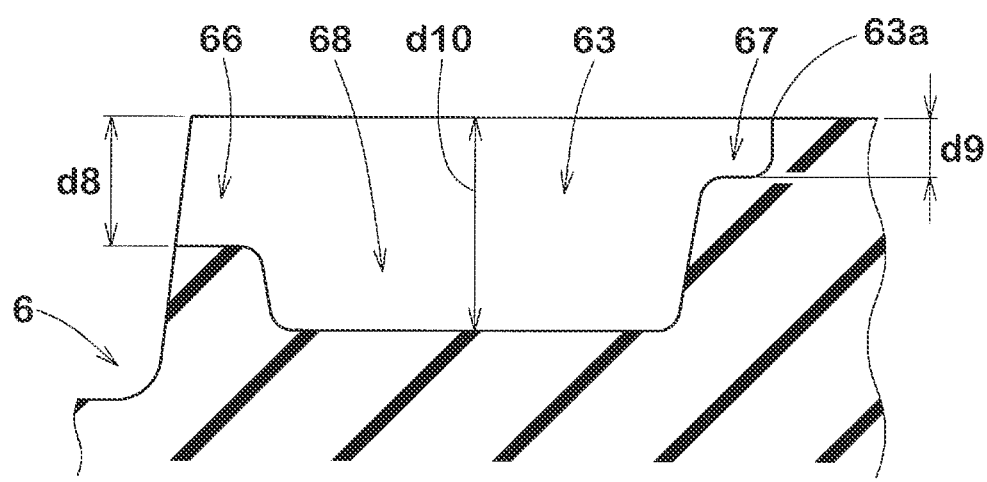
FIG. 10 is a cross-sectional view taken along a line E-E in FIG. 7.

FIG. 10 shows a cross-sectional view taken along a line E-E in FIG. 7. It is considered that, on the inner wall of the actual first crown sipe 63, a folded portion of the zigzag of the sipe appears as a ridge. However, the folded portion is not shown in FIG. 10. As shown in FIG. 10, the first crown sipe 63 includes a first portion 66 communicating with the crown circumferential groove 6, a second portion 67 including the termination end 63*a*, and a third portion 68 between the first portion 66 and the second portion 67. The first portion 66 has a smaller depth than the third portion 68. A depth d8 of the first portion 66 is 50% to 70% of a depth d10 of the third portion 68. In addition, the second portion 67 has a smaller depth than the first portion 66. A depth d9 of the second portion 67 is 20% to 35% of the depth d10 of the third portion 68. The third portion 68 has the maximum depth of the first crown sipe 63. Such a first crown sipe 63 serves to enhance on-snow performance and steering stability in a well-balanced manner. The second crown sipe 64 has the same cross-sectional shape as the first crown sipe 63. Therefore, the above-described configuration of the first crown sipe 63 can be applied to the second crown sipe 64.

As shown in FIG. 7, each crown block 55 has a crown circumferential sipe 70 extending in the tire circumferential direction between the first crown sipe 63 and the second crown sipe 64. The crown circumferential sipe 70 of the present embodiment is connected to the first crown sipe 63 and the second crown sipe 64. However, the crown circumferential sipe 70 may be a sipe that is not connected to these sipes. The crown circumferential sipe 70 has, for example, a smaller depth than the first crown sipe 63 and the second crown sipe 64. The maximum depth of the crown circumferential sipe 70 is 20% to 35% of the maximum depth of the first crown sipe 63. In a preferable mode, the crown circumferential sipe 70 is formed with the same depth as the second portion 67 of the first crown sipe 63. Such a crown circumferential sipe 70 can enhance cornering performance on snow or ice while suppressing uneven wear of the crown block 55.

The crown blocks 55 include first crown blocks 56 and second crown blocks 57 having different arrangements of the crown circumferential sipes 70. On each first crown block 56, the crown circumferential sipe 70 is provided on the first crown circumferential edge 55*a* side with respect to the center position in the tire axial direction of the ground-contact surface of the first crown block 56. On each second crown block 57, the crown circumferential sipe 70 is provided on the second crown circumferential edge 55*b* side with respect to the center position in the tire axial direction of the ground-contact surface of the second crown block 57. In a preferable mode, the first crown blocks 56 and the second crown blocks 57 are alternately provided in the tire circumferential direction. Accordingly, local deformation is suppressed in the first crown blocks 56 and the second crown blocks 57, and excellent steering stability is exhibited.

Figure 11:
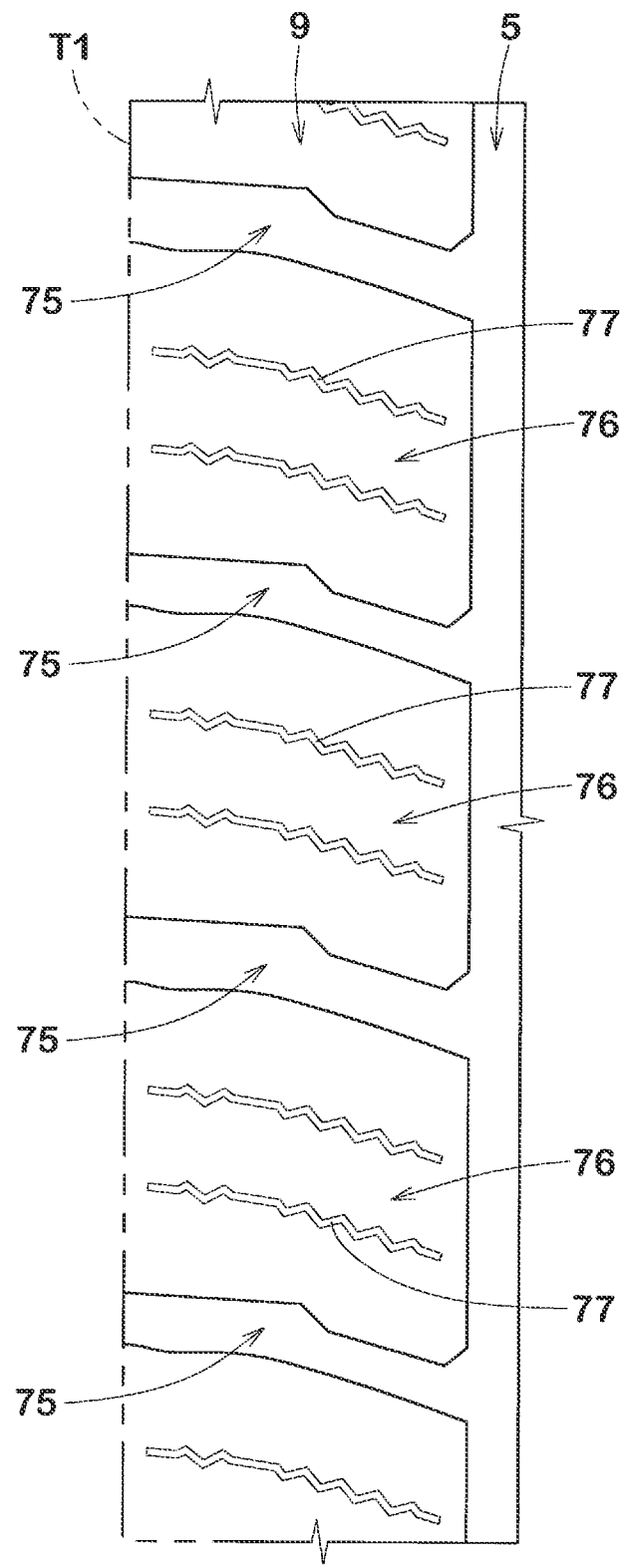
FIG. 11 is an enlarged view of a shoulder land portion in FIG. 1.

FIG. 11 shows an enlarged view of the shoulder land portion 9 in FIG. 1. As shown in FIG. 11, the shoulder land portion 9 includes a plurality of shoulder blocks 76 demarcated by a plurality of shoulder lateral grooves 75 which fully traverse the shoulder land portion 9 in the tire axial direction.

Each shoulder block 76 has, for example, a plurality of shoulder sipes 77 extending in a zigzag manner. In a more preferable mode, each shoulder sipe 77 terminates at both ends thereof within the shoulder block 76. Such a shoulder sipe 77 serves to improve on-snow performance and steering stability in a well-balanced manner.

Although the tire according to the embodiment of the present invention has been described in detail above, the present invention is not limited to the above specific embodiment, and various modifications can be made to implement the present invention.

EXAMPLES

Figure 12:
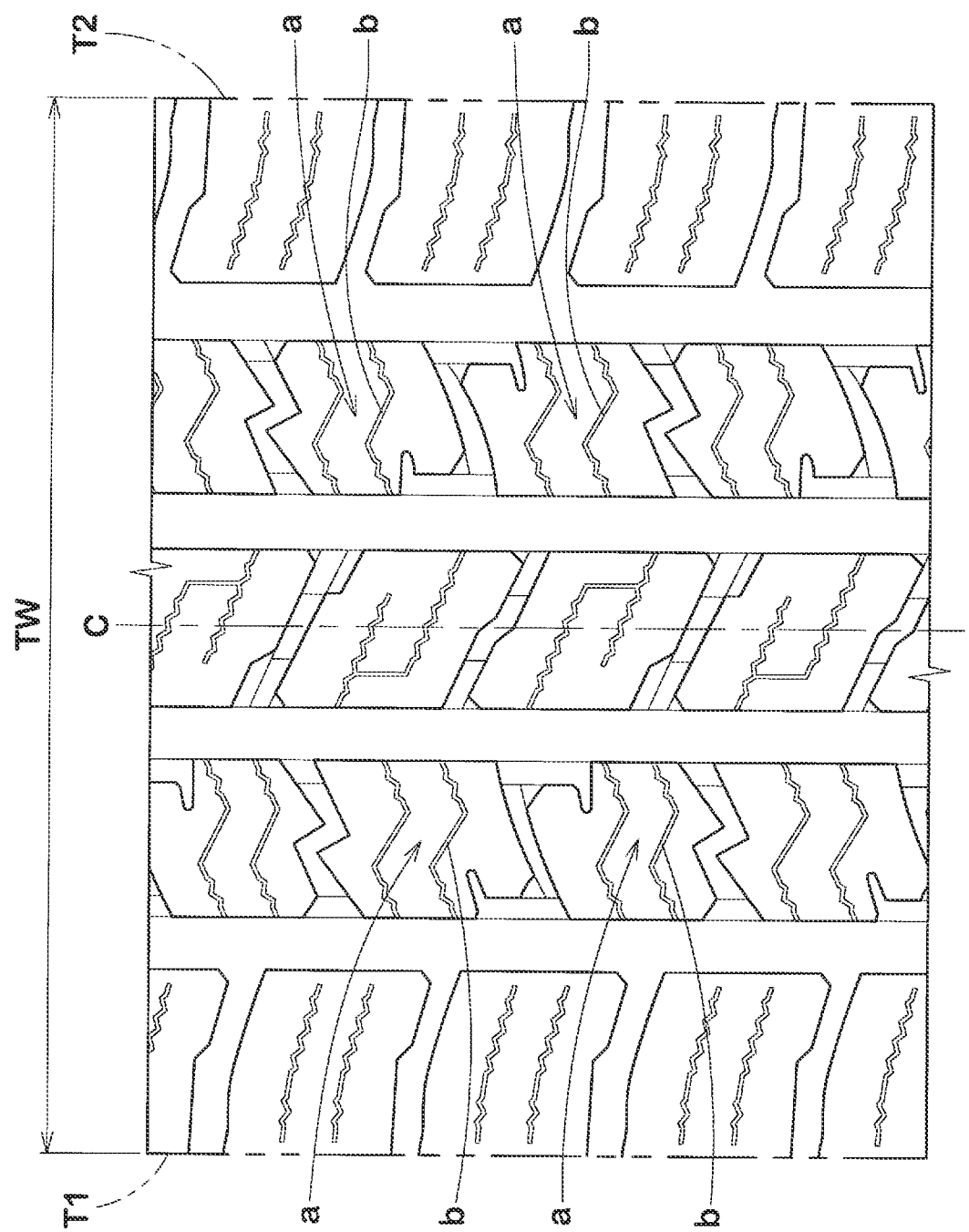
FIG. 12 is a development of a tread portion of a tire of a comparative example.

Tires with a size of 265/70R17 having the basic pattern in FIG. 1 were produced as test tires on the basis of specifications in Table 1. In addition, as a comparative example, a tire having middle sipes b which fully traverse middle blocks a in the tire axial direction as shown in FIG. 12 was produced as a test tire. The tire of the comparative example is substantially the same as that shown in FIG. 1, except for the above-described matter. Each test tire was tested for on-snow performance and steering stability on a dry road surface. The common specifications and the test methods for the respective test tires are as follows.

Mount rim: 17×8J
Tire internal pressure: 410 kPa
Test vehicle: four-wheel-drive vehicle having an engine displacement of 4000 cc
Tire mounted position: all wheels
<On-Snow Performance>
Sensory evaluation was made by a driver for running performance when the test vehicle ran on snow. The results are indicated as scores with the on-snow performance of the comparative example being regarded as 100. A higher value indicates that the on-snow performance is better.
<Steering Stability on Dry Road Surface>
Sensory evaluation was made by a driver for steering stability when the test vehicle ran on a dry road surface. The results are indicated as scores with the steering stability of the comparative example being regarded as 100. A higher value indicates that the steering stability on a dry road surface is better.

The results of the tests are shown in Table 1.

As a result of the tests, it is confirmed that the tire of each Example has improved steering stability on a dry road surface while maintaining on-snow performance.

What is claimed is:
1. A tire comprising:
a tread portion, the tread portion including a plurality of circumferential grooves continuously extending in a tire circumferential direction between a first tread end and a second tread end, and a plurality of land portions demarcated by the plurality of circumferential grooves,
the plurality of land portions include one middle land portion between the first tread end and a tire equator,
the middle land portion includes a plurality of middle blocks demarcated by a plurality of middle lateral grooves fully traversing the middle land portion in a tire axial direction,
at least one of the middle lateral grooves includes a first middle tie bar raised at a groove bottom portion at an end portion on an outer side in the tire axial direction thereof, and a second middle tie bar raised at the groove bottom portion at an end portion on an inner side in the tire axial direction thereof,
a first recess extends from the end portion on the outer side in the tire axial direction of the at least one of the middle lateral grooves to a first side in the tire circumferential direction, and a second recess extends from the end portion on the inner side in the tire axial direction of the at least one of the middle lateral grooves to a second side opposite the first side in the tire circumferential direction,
the plurality of middle blocks each includes a ground-contact surface, a first middle circumferential edge extending in the tire circumferential direction on the outer side in the tire axial direction of the ground-contact surface, and a second middle circumferential edge extending in the tire circumferential direction on the inner side in the tire axial direction of the ground-contact surface,
at least one first middle sipe extending from the first middle circumferential edge and including a termination end within the ground-contact surface and at least one second middle sipe extending from the second middle circumferential edge and including a termination end within the ground-contact surface are on the ground-contact surface of at least one middle block of the plurality of middle blocks,
the termination end of the first middle sipe is located on the inner side in the tire axial direction with respect to the first middle tie bar,

TABLE 1

|  | Comp. Ex. | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- | --- |
| Drawing showing tread pattern | FIG. 12 | FIG. 1 | FIG. 1 | FIG. 1 | FIG. 1 | FIG. 1 | FIG. 1 | FIG. 1 | FIG. 1 | FIG. 1 |
| Length L7 of first region/width W2 of middle block (%) | — | 30 | 20 | 25 | 35 | 40 | 30 | 30 | 30 | 30 |
| Length L5 of first middle tie bar/width W2 of middle block (%) | 13 | 13 | 13 | 13 | 13 | 13 | 5 | 10 | 15 | 20 |
| Length L6 of second middle tie bar/width W2 of middle block (%) | 13 | 13 | 13 | 13 | 13 | 13 | 5 | 10 | 15 | 20 |
| On-snow performance (score) | 100 | 102 | 102 | 102 | 101 | 100 | 103 | 102 | 101 | 100 |
| Steering stability on dry road surface (score) | 100 | 110 | 105 | 108 | 110 | 112 | 104 | 108 | 111 | 113 | the termination end of the second middle sipe is located on the outer side in the tire axial direction with respect to the second middle tie bar and located on the inner side in the tire axial direction with respect to the termination end of the first middle sipe, no groove and no sipe are in a first region which is located on the inner side in the tire axial direction with respect to the termination end of the first middle sipe and on the outer side in the tire axial direction with respect to the termination end of the second middle sipe, on the ground-contact surface of the at least one middle block, the plurality of land portions include a crown land portion adjacent to the inner side in the tire axial direction of the middle land portion via the circumferential groove, the crown land portion includes a plurality of crown blocks demarcated by a plurality of crown lateral grooves fully traversing the crown land portion in the tire axial direction, the plurality of crown blocks each include a ground-contact surface, a first crown circumferential edge extending in the tire circumferential direction on the first tread end side of the ground-contact surface, and a second crown circumferential edge extending in the tire circumferential direction on the second tread end side of the ground-contact surface, at least one first crown sipe extending from the first crown circumferential edge and including a termination end within the ground-contact surface and at least one second crown sipe extending from the second crown circumferential edge and including a termination end within the ground-contact surface are on the ground-contact surface of at least one crown block of the plurality of crown blocks, at least one of the crown lateral grooves includes a first crown tie bar raised at a groove bottom portion at an end portion on the first tread end side thereof, and a second crown tie bar raised at the groove bottom portion at an end portion on the second tread end side thereof, and in a tread plan view, the termination end of the first crown sipe is at a position overlapping a region obtained by extending the second crown tie bar in parallel with the tire circumferential direction.

2. The tire according to claim 1, wherein the middle lateral grooves include a first middle lateral groove having at least a bent portion at one location.

3. The tire according to claim 2, wherein the bent portion is located between the termination end of the first middle sipe and the termination end of the second middle sipe in the tire axial direction.

4. The tire according to claim 1, wherein a length in the tire axial direction of the first region is 20% to 40% of a width in the tire axial direction of the at least one middle block.

5. The tire according to claim 1, wherein
the circumferential grooves include two shoulder circumferential grooves and two crown circumferential grooves,
one of the shoulder circumferential grooves is between the first tread end and the tire equator, and an other of the shoulder circumferential grooves is between the second tread end and the tire equator, and
one of the crown circumferential grooves is between the one of the shoulder circumferential grooves and the tire equator, and another of the crown circumferential grooves is between the other of the shoulder circumferential grooves and the tire equator.

6. The tire according to claim 5, wherein
a distance in the tire axial direction from the tire equator to a groove center line of the one of the shoulder circumferential grooves is 25% to 35% of a tread width which is a distance in the tire axial direction from the first tread end to the second tread end in a normal state.

7. The tire according to claim 5, wherein
a distance in the tire axial direction from the tire equator to a groove center line of the crown circumferential groove is 5% to 15% of a tread width which is a distance in the tire axial direction from the first tread end to the second tread end in a normal state.

8. The tire according to claim 1, wherein
each of the circumferential grooves extends parallel to the tire circumferential direction.

9. The tire according to claim 1, wherein
at least one of the circumferential grooves is wavy.

10. The tire according to claim 1, wherein
a groove width of at least one of the circumferential grooves is 3.0% to 7.0% of a tread width which is a distance in the tire axial direction from the first tread end to the second tread end in a normal state.

11. The tire according to claim 1, wherein
a length of the first middle sipe is 150% to 300% of a length in the tire axial direction of the first middle tie bar.

12. The tire according to claim 1, wherein
a length of the second middle sipe is 1.5 to 3.0 times a length in the tire axial direction of the second middle tie bar.

13. The tire according to claim 1, wherein
each of the first middle sipe and the second middle sipe are inclined relative to the tire axial direction in a same direction.

14. The tire according to claim 1, wherein
each of the first middle sipe and the second middle sipe is inclined at an angle of 20° to 35° with respect to the tire axial direction.

15. The tire according to claim 1, comprising:
a first termination groove connected to the first recess at an end portion thereof on the outer side in the tire axial direction and terminating on the inner side in the tire axial direction within the ground-contact surface of the middle land portion, and a second termination groove connected to the second recess at an end portion thereof on the inner side in the tire axial direction and terminating on the outer side in the tire axial direction within the ground-contact surface of the middle land portion.

16. A tire comprising:
a tread portion, the tread portion including a plurality of circumferential grooves continuously extending in a tire circumferential direction between a first tread end and a second tread end, and a plurality of land portions demarcated by the plurality of circumferential grooves, the plurality of land portions include one middle land portion between the first tread end and a tire equator, the middle land portion includes a plurality of middle blocks demarcated by a plurality of middle lateral grooves fully traversing the middle land portion in a tire axial direction, at least one of the middle lateral grooves includes a first middle tie bar raised at a groove bottom portion at an end portion on an outer side in the tire axial direction thereof, and a second middle tie bar raised at the groove bottom portion at an end portion on an inner side in the tire axial direction thereof, the plurality of middle blocks each includes a ground-contact surface, a first middle circumferential edge extending in the tire circumferential direction on the outer side in the tire axial direction of the ground-contact surface, and a second middle circumferential edge extending in the tire circumferential direction on the inner side in the tire axial direction of the ground-contact surface, at least one first middle sipe extending from the first middle circumferential edge and including a termination end within the ground-contact surface and at least one second middle sipe extending from the second middle circumferential edge and including a termination end within the ground-contact surface are on the ground-contact surface of at least one middle block of the plurality of middle blocks, the termination end of the first middle sipe is located on the inner side in the tire axial direction with respect to the first middle tie bar, the termination end of the second middle sipe is located on the outer side in the tire axial direction with respect to the second middle tie bar and located on the inner side in the tire axial direction with respect to the termination end of the first middle sipe, and no groove and no sipe are in a first region which is located on the inner side in the tire axial direction with respect to the termination end of the first middle sipe and on the outer side in the tire axial direction with respect to the termination end of the second middle sipe, on the ground-contact surface of the at least one middle block, wherein the plurality of land portions includes a crown land portion adjacent to the inner side in the tire axial direction of the middle land portion via the circumferential groove, the crown land portion includes a plurality of crown blocks demarcated by a plurality of crown lateral grooves fully traversing the crown land portion in the tire axial direction, the plurality of crown blocks each include a ground-contact surface, a first crown circumferential edge extending in the tire circumferential direction on the first tread end side of the ground-contact surface, and a second crown circumferential edge extending in the tire circumferential direction on the second tread end side of the ground-contact surface, at least one first crown sipe extending from the first crown circumferential edge and including a termination end within the ground-contact surface and at least one second crown sipe extending from the second crown circumferential edge and including a termination end within the ground-contact surface are on the ground-contact surface of at least one crown block of the plurality of crown blocks, at least one of the crown lateral grooves includes a first crown tie bar raised at a groove bottom portion at an end portion on the first tread end side thereof, and a second crown tie bar raised at the groove bottom portion at an end portion on the second tread end side thereof, and in a tread plan view, the termination end of the first crown sipe is at a position overlapping a region obtained by extending the second crown tie bar in parallel with the tire circumferential direction.

17. The tire according to claim 16, wherein, in a tread plan view, the termination end of the second crown sipe is at a position overlapping a region obtained by extending the first crown tie bar in parallel with the tire circumferential direction.

18. A tire comprising:
a tread portion, the tread portion including a plurality of circumferential grooves continuously extending in a tire circumferential direction between a first tread end and a second tread end, and a plurality of land portions demarcated by the plurality of circumferential grooves,
the plurality of land portions include one middle land portion between the first tread end and a tire equator,
the middle land portion includes a plurality of middle blocks demarcated by a plurality of middle lateral grooves fully traversing the middle land portion in a tire axial direction,
at least one of the middle lateral grooves includes a first middle tie bar raised at a groove bottom portion at an end portion on an outer side in the tire axial direction thereof, and a second middle tie bar raised at the groove bottom portion at an end portion on an inner side in the tire axial direction thereof,
the plurality of middle blocks each includes a ground-contact surface, a first middle circumferential edge extending in the tire circumferential direction on the outer side in the tire axial direction of the ground-contact surface, and a second middle circumferential edge extending in the tire circumferential direction on the inner side in the tire axial direction of the ground-contact surface,
at least one first middle sipe extending from the first middle circumferential edge and including a termination end within the ground-contact surface and at least one second middle sipe extending from the second middle circumferential edge and including a termination end within the ground-contact surface are on the ground-contact surface of at least one middle block of the plurality of middle blocks,
the termination end of the first middle sipe is located on the inner side in the tire axial direction with respect to the first middle tie bar,
the termination end of the second middle sipe is located on the outer side in the tire axial direction with respect to the second middle tie bar and located on the inner side in the tire axial direction with respect to the termination end of the first middle sipe, and
no groove and no sipe are in a first region which is located on the inner side in the tire axial direction with respect to the termination end of the first middle sipe and on the outer side in the tire axial direction with respect to the termination end of the second middle sipe, on the ground-contact surface of the at least one middle block, wherein
the plurality of land portions includes a crown land portion adjacent to the inner side in the tire axial direction of the middle land portion via the circumferential groove,
the crown land portion includes a plurality of crown blocks demarcated by a plurality of crown lateral grooves fully traversing the crown land portion in the tire axial direction,
the plurality of crown blocks each include a ground-contact surface, a first crown circumferential edge extending in the tire circumferential direction on the first tread end side of the ground-contact surface, and a second crown circumferential edge extending in the tire circumferential direction on the second tread end side of the ground-contact surface, at least one first crown sipe extending from the first crown circumferential edge and including a termination end within the ground-contact surface and at least one second crown sipe extending from the second crown circumferential edge and including a termination end within the ground-contact surface are on the ground-contact surface of at least one crown block of the plurality of crown blocks, the termination end of the second crown sipe is located on the first crown circumferential edge side with respect to the termination end of the first crown sipe, and the crown block has a crown circumferential sipe extending in the tire circumferential direction between the first crown sipe and the second crown sipe.

19. The tire according to claim 18, wherein the crown blocks include a plurality of first crown blocks and a plurality of second crown blocks, on each of the first crown blocks, the crown circumferential sipe is on the first crown circumferential edge side with respect to a center position in the tire axial direction of a ground-contact surface of the first crown block, and on each of the second crown blocks, the crown circumferential sipe is on the second crown circumferential edge side with respect to a center position in the tire axial direction of a ground-contact surface of the second crown block.

20. The tire according to claim 19, wherein the first crown blocks and the second crown blocks are alternately arranged in the tire circumferential direction.

* * * * *